(12) United States Patent
Rozenblit et al.

(10) Patent No.: US 10,018,747 B2
(45) Date of Patent: Jul. 10, 2018

(54) MEASUREMENT WHILE DRILLING SYSTEM AND METHOD

(71) Applicant: TERRAMATIX PTE. LTD., Singapore (SG)

(72) Inventors: Vlad Rozenblit, Houston, TX (US); Vadim Buryakovsky, Houston, TX (US); Michael Lev, Yoqneam (IL)

(73) Assignee: R & B Industrial Supply Co., Houston, TX (US)

( * ) Notice: Subject to any disclaimer, the term of this patent is extended or adjusted under 35 U.S.C. 154(b) by 40 days.

(21) Appl. No.: 15/378,319

(22) Filed: Dec. 14, 2016

(65) Prior Publication Data

US 2017/0184754 A1    Jun. 29, 2017

Related U.S. Application Data

(60) Provisional application No. 62/267,315, filed on Dec. 15, 2015.

(51) Int. Cl.
| | |
|---|---|
| *G01V 3/28* | (2006.01) |
| *G01V 5/12* | (2006.01) |
| *E21B 47/12* | (2012.01) |
| *E21B 47/024* | (2006.01) |
| *G01V 3/24* | (2006.01) |

(52) U.S. Cl.
CPC .............. *G01V 3/28* (2013.01); *E21B 47/024* (2013.01); *E21B 47/122* (2013.01); *G01V 3/24* (2013.01); *G01V 5/12* (2013.01)

(58) Field of Classification Search
CPC ........ G01V 3/24; E21B 47/024; E21B 47/122
See application file for complete search history.

(56) References Cited

U.S. PATENT DOCUMENTS

| | | | |
|---|---|---|---|
| 2003/0075361 A1* | 4/2003 | Terry ....................... | G01V 3/30 175/61 |
| 2007/0152054 A1* | 7/2007 | Bonavides .......... | E21B 47/0002 235/454 |
| 2014/0231139 A1* | 8/2014 | Rozenblit ............. | E21B 47/121 175/40 |

* cited by examiner

*Primary Examiner* — Jermele M Hollington
*Assistant Examiner* — Alvaro Fortich
(74) *Attorney, Agent, or Firm* — Reches Patents

(57) ABSTRACT

A measurement while drilling (MWD) system for use in a drilling string, the MWD system comprises: a resistivity module that is configured to generate resistivity information about a resistivity of a formation that is drilled by the drilling string; a near bit sub that is configured to generate inclination information about an inclination of a drill bit of the drilling string; a MWD module; a first wireless communication module that is configured to wirelessly send the resistivity information from the resistivity module to the MWD module; a second wireless communication module that is configured to wirelessly send inclination information from the near bit sub module to the MWD module; and wherein the MWD module is configured to participate in a transmission of the inclination information and the resistivity information towards an upper surface of the formation.

20 Claims, 6 Drawing Sheets

MEASUREMENT WHILE DRILLING SYSTEM AND METHOD

This application claims priority of U.S. provisional patent Ser. No. 62/267,315 filing date Dec. 15, 2015 which is incorporated herein by reference.

BACKGROUND

The Measurement While Drilling (MWD) systems guide the drilling engineer to correctly project the direction of a new well according to the drilling plan. The MWD sensors (located about 15-20 m from the bit) include directional module (azimuth, inclination, rotation), vibration, background gamma radiation, and optionally: formation resistivity. Additionally, in order to obtain a more precise reading, the directional sensors are sometimes placed near the bit (Near Bit Sub).

The use of Resistivity tools in the MWD application currently has two main issues.

The mechanical connection between the Resistivity module and MWD tool is the weakest point of system. The need to install the MWD and Resistivity firmly in the drilling collar and the significant length of the combined string, calls for special ways to connect these instruments together. Two main solutions are now used: Telescopic Connector and Finger Rotary Connector.

Both of these connections have problems with: proper contact maintenance, lining up while assembly and flooding. Furthermore, any failure with the connector will also cause the failure of the entire combined system.

The length of the combined string is significant and it introduces additional mechanical stresses due to the flexing of the tools while drilling. causing premature failures from fatigue.

SUMMARY

There may be provided a measurement while drilling (MWD) system for use in a drilling string, the MWD system may include a resistivity module that may be configured to generate resistivity information about a resistivity of a formation that may be drilled by the drilling string; a near bit sub that may be configured to generate inclination information about an inclination of a drill bit of the drilling string; a MWD module; a first wireless communication module that may be configured to wirelessly send the resistivity information from the resistivity module to the MWD module; a second wireless communication module that may be configured to wirelessly send inclination information from the near bit sub module to the MWD module; and wherein the MWD module may be configured to participate in a transmission of the inclination information and the resistivity information towards an upper surface of the formation.

The first wireless communication module may be configured to wirelessly send the resistivity information through an inner space of the drilling string.

The second wireless communication module may be configured to wirelessly send the resistivity information through the formation.

The first wireless communication module may include a short hop receiver that may be electrically coupled to the MWD module and a short hop transmitter that may be electrically coupled to the resistivity module.

The distance between the resistivity module and the MWD module may not exceed 60 feets.

The short hop receiver and the short hop transmitter may communicate using low frequency radiation.

The low frequency radiation may be about one kilo Hertz (for example between 800 Hertz and 1200 Hertz).

The MWS system may include resistivity module battery that may be positioned between the resistivity module and the MWD module. The short hop transmitter may include a transmission antenna that may be mounted on top (or otherwise located proximate to) of the resistivity module battery.

The transmission antenna may be a coil of a magnetic wire that may be wound on a core. Any other type of transmission antenna may be used.

The resistivity module may be further configured to generate pressure information about a drilling fluid pressure and wherein the first wireless communication module may be configured to wirelessly send the pressure information from the resistivity module to the MWD module.

The near bit sub may be further configured to generate gamma radiation information about gamma radiation, rotation information about a rotation of the drill bit and vibration information about vibrations of the drill bit; and wherein the second wireless communication module may be configured to wirelessly send the gamma radiation information, rotation information and the vibration information to the MWD module.

The MWD module may be configured to participate in a transmission of the inclination information, the resistivity information, the gamma radiation information, the rotation information, and the vibration information towards the upper surface of the formation.

The MWD module may be configured to generate azimuth information about an azimuth of the drilling string, magnetic information, and gravity information; and to participate in a transmission of the inclination information, the resistivity information, the gamma radiation information, the rotation information, the vibration information, the azimuth information, the magnetic information, and the gravity information towards the upper surface of the formation.

The MWD module may be configured to generate azimuth information about an azimuth of the drilling string, magnetic information, and gravity information; and to participate in a transmission of the inclination information, the resistivity information, the azimuth information, the magnetic information, and the gravity information towards the upper surface of the formation.

There may be provided a method that may include generating, by a resistivity module of a drilling string, resistivity information about a resistivity of a formation that may be drilled by the drilling string; generating, by a near bit sub of the drilling string, inclination information about an inclination of a drill bit of the drilling string; wirelessly sending, by a first wireless communication module of the drilling string, the resistivity information from the resistivity module to a measurement while drilling (MWD) module; wirelessly sending, by a second wireless communication module of the drilling string, the inclination information from the near bit sub module to the MWD module; and participating in a transmission, by the MWD module, of the inclination information and the resistivity information towards an upper surface of the formation.

The method may include wirelessly sending the resistivity information to the MWD module through an inner space of the drilling string.

The method may include wirelessly sending the resistivity information to the MWD module through the formation.

The first wireless communication module may include a short hop receiver that may be electrically coupled to the MWD module and a short hop transmitter that may be electrically coupled to the resistivity module.

The distance between the resistivity module and the MWD module does not exceed 60 feets.

The method may include transmitting the resistivity information to the short hop receiver and from the short hop transmitter using low frequency radiation.

The low frequency radiation may be about kilo Hertz.

The method may include transmitting the resistivity information to the MWD module by using a transmission antenna; wherein the transmission antenna may be mounted on top of a resistivity module battery that may be positioned between the resistivity module and the MWD module.

The transmission may use a transmission antenna that may be a coil of a magnetic wire that may be wound on a core.

The method may include generating by the resistivity module pressure information about a drilling fluid pressure; and wherein the method may include wirelessly sending, by the first wireless communication module, the pressure information to the MWD module.

The method may include generating by the near bit sub gamma radiation information about gamma radiation, rotation information about a rotation of the drill bit and vibration information about vibrations of the drill bit; and wherein the method may include wirelessly sending by the second wireless communication module the gamma radiation information, rotation information and the vibration information to the MWD module.

The method may include participating, by the MWD module in a transmission of the inclination information, the resistivity information, the gamma radiation information, the rotation information, and the vibration information towards the upper surface of the formation.

The method may include generating by the MWD module azimuth information about an azimuth of the drilling string, magnetic information and gravity information; and wherein the method may include participating, by the MWD module, in a transmission of the inclination information, the resistivity information, the gamma radiation information, the rotation information, the vibration information, the azimuth information, the magnetic information and the gravity information towards the upper surface of the formation.

The method may include generating, by the MWD module, azimuth information about an azimuth of the drilling string, magnetic information, and gravity information; and participating, by the MWD module, in a transmission of the inclination information, the resistivity information, the azimuth information, the magnetic information, and the gravity information towards the upper surface of the formation.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
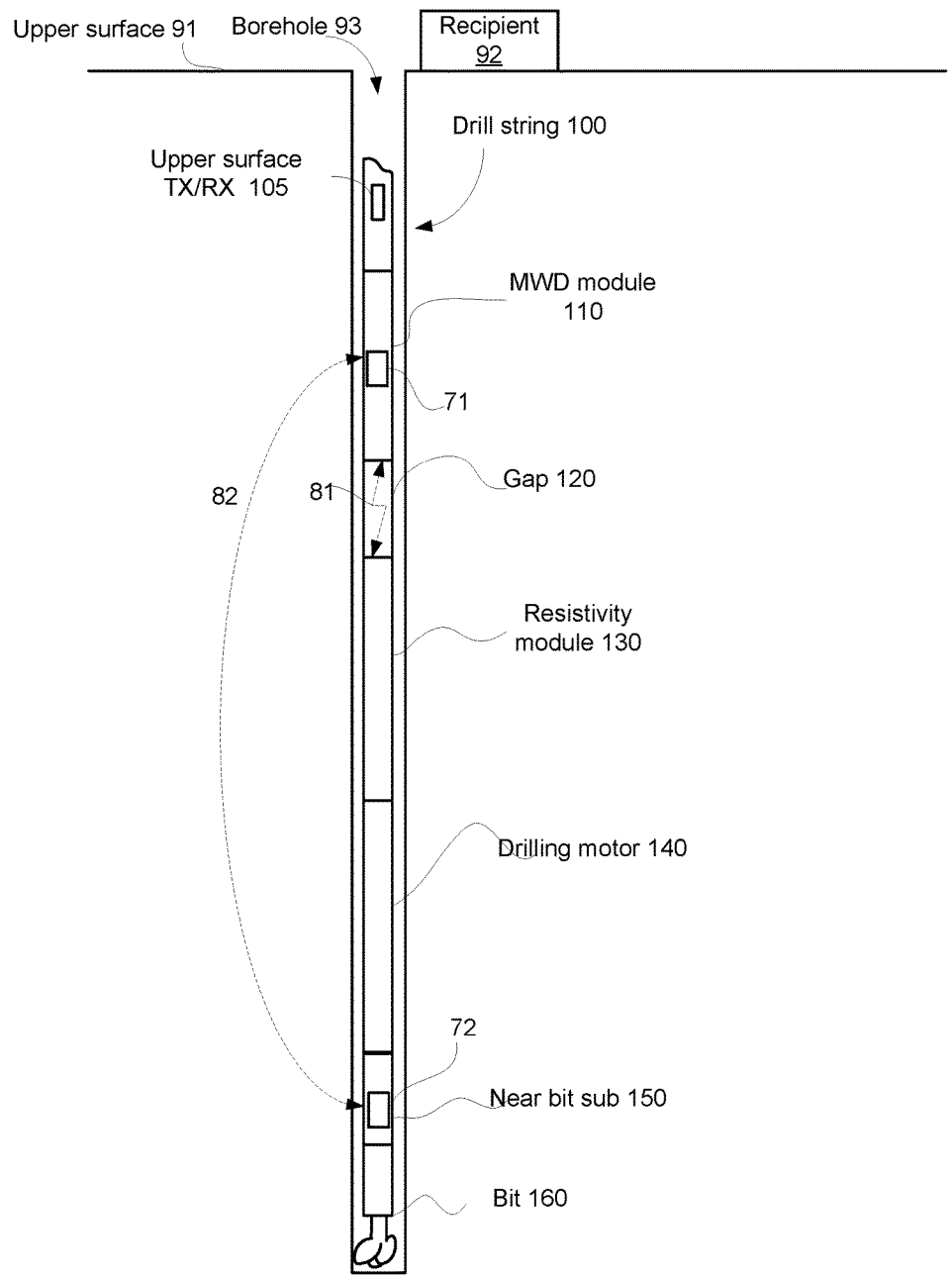
FIG. 1 illustrates a drilling string that includes a MWD system according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

According to an embodiment of the invention there may be provided a system and a method. Any reference to a system should by applied mutatis mutandis to a method for operating the system.

MWD System and Method

There are provided a MWD method and a MWD system that use one or more wireless links between the resistivity module and the MWD module through (for example) a metal free space inside of the drilling string and/or through a path outside of the drilling string.

When using such a drilling string the listed above problems of the prior art will be eliminated. Furthermore, any failure in a module out of the NWD module and the resistivity module will not cause the whole system to fail.

The MWD system may include a near bit sub (a subsystem that is located near the drilling bit), the resistivity module and the MWD module.

The resistivity module measures the (electrical) resistivity of a region of the formation that is proximate to the resistivity module. The resistivity information generated by the resistivity module assists in detecting the presence of oil (high resistivity readings—as opposed to low resistivity reading for water). The operator may deduce, from the resistivity information whether the drilling string is steered in the right place. Especially when drilling in a thin oil bed.

The resistivity information may assist the operator to determine that the well is going through the thin oil bed.

The MWD system may also include first and second wireless communication modules for wirelessly transmitting information between the MWD module and each one of the bear bit sub and the resistivity module. The wireless communication can be unidirectional (towards the MWD module) and/or may be bidirectional (towards the MWD module and towards the resistivity module and/or the near bit sub). The MWD module may, for example send commands and/or configuration information and/or triggering signals to the resistivity module and/or to the near bit sub. For example—the MWD module may instruct the resistivity module how often to take resistivity readings, and to go on standby (sleep) mode.

Any reference to bidirectional communication can be interpreted as a reference to unidirectional communication and vise verse. For example—a receiver and/or a transmitter may be replaced by a transceiver.

Any reference to the transmission, reception or sending of information may be applied to the transmission, reception or sending of commands and/or instructions and/or triggering signals.

FIG. 1 illustrates a drilling string 100 that drills within a borehole 93 that is formed in a geological formation (hereinafter formation) 90 that has an upper surface 91. A recipient 92 may be positioned on the upper surface 91 (or in another location that is above the drilling string 100). The recipient 92 may be a receiver, a transceiver, or any other part of a measurement and/or control system. The measurement and/or control system may be used to control the drill string 100.

The drill string 100 is illustrated as including an upper surface transceiver (denoted upper surface TX/RX) module 105 for communicating between MWD module 110 and recipient. The transmission can be wired, wireless, can user mud pulse, electromagnetic radiation, and the like.

The drill string 100 may also include a sequence of MWD module 110, gap 120, resistivity module 130, drilling motor 140, near bit sub 150 and drill bit 160.

MWD module 110 and resistivity module 130 may be separated by gap 120. The first wireless communication module (not shown) may wirelessly exchange information between the MWD module 110 and the resistivity module 130 using a first wireless link 81. The first wireless link 81 propagates through gap 120 (that may be metal free) and/or may propagate through the formation 90.

A second wireless communication module (includes transceiver or transmitter 72 and transceiver or receiver 71) may wirelessly exchange information between the MWD module 110 and the near bit sub 160 using a second wireless link 82 that passes through the formation 90. The transmission may be executed through the drilling string itself.

In FIG. 1 the first communication module is omitted and parts of the second wireless communication is illustrated as being included in the near bit sub 150. This is for brevity of explanation.

The drilling motor 140 rotates the drilling bit 160.

Resistivity and Inclination Information

Figure 5:
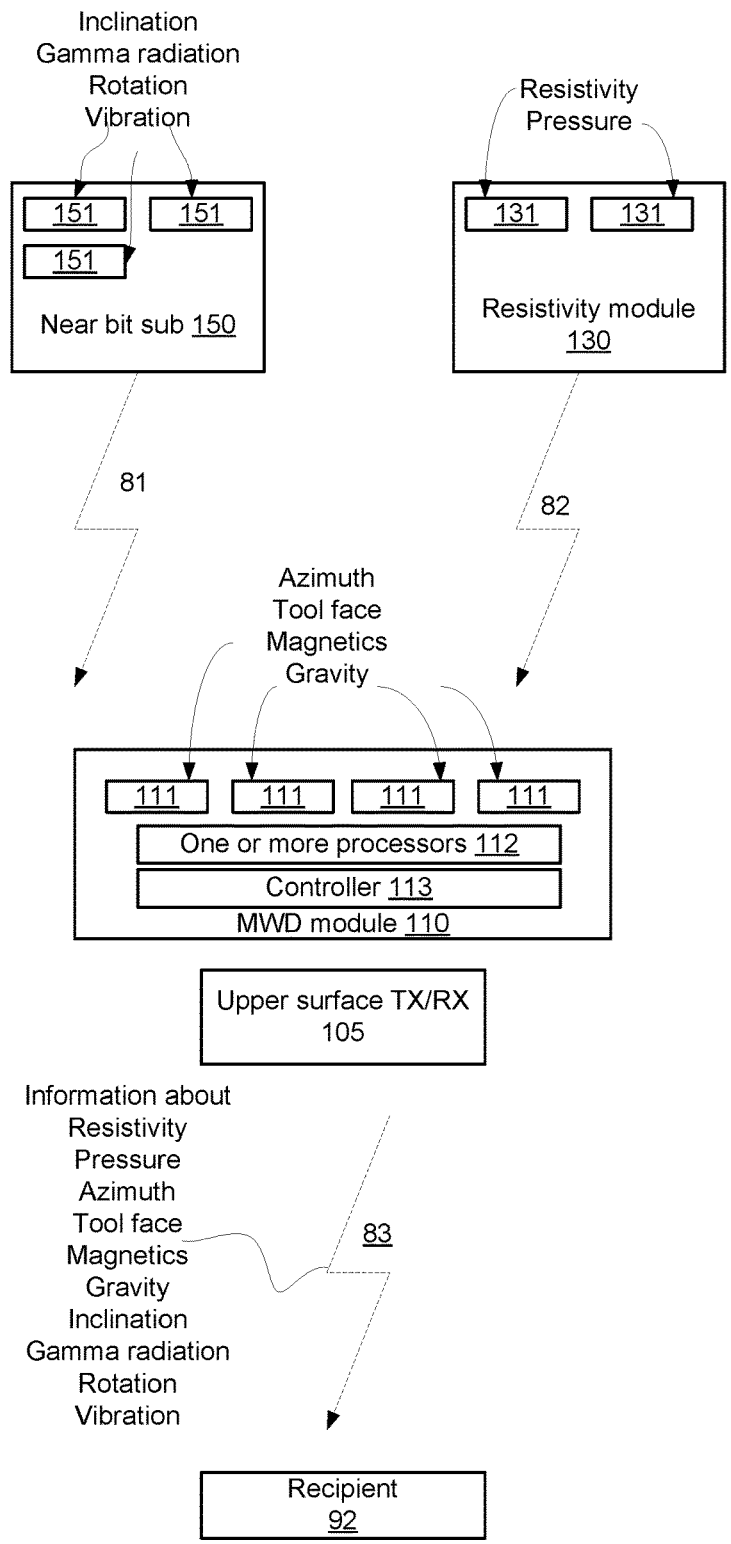
FIG. 5 illustrates a flow of information according to an embodiment of the invention.

The resistivity module 130 may be configured to generate resistivity information about a resistivity of formation 90. The generation of the resistivity information may include sensing the resistivity using one or more sensors and/or processing resistivity readings from the one or more sensors. The processing may include, for example, noise rejection. FIG. 5 illustrate one or more sensors 111—and at least one of these sensors may sense the resistivity.

The first wireless communication module may be configured to wirelessly send the resistivity information from the resistivity module to the MWD module.

The near bit sub 150 may be configured to generate inclination information about an inclination of drill bit 160. The generation of the inclination information may include sensing the inclination using one or more sensors and/or processing inclination readings from the one or more sensors. The processing may include, for example, noise rejection. FIG. 5 illustrate one or more sensors 151—and at least one of these sensors may sense the inclination.

The second wireless communication module (parts 71 and 72) may be configured to wirelessly send the inclination information from the near bit sub module 150 to the MWD module 110.

The MWD module 110 may be configured to participate in a transmission of the inclination information and the resistivity information towards an upper surface of the formation—for example towards recipient 92.

The MWD module 110 participates in the transmission as it may transmit said information by itself, may instruct upper surface TX/RX module 105 to transmit send information, may trigger the transmission of the information by the upper surface TX/RX module 105 or may send the information to the upper surface TX/RX module 105 thereby causing the upper surface TX/RX module 105 to transmit the information.

It is noted that at least one of the resistivity module 130, the MWD module 110 and the near bit sub 150 may sense additional information and/or redundant information. Redundant information refers to the same type of information that is sensed by two different modules out of resistivity module 130, the MWD module 110 and the near bit sub 150. Additional information refers to information that differs from inclination information (already sensed by near bit sub 150) and resistivity information (that already is sensed by resistivity module).

Some examples of the additional information and/or redundant information is shown in FIG. 5.

First Wireless Communication Module

Figure 2:
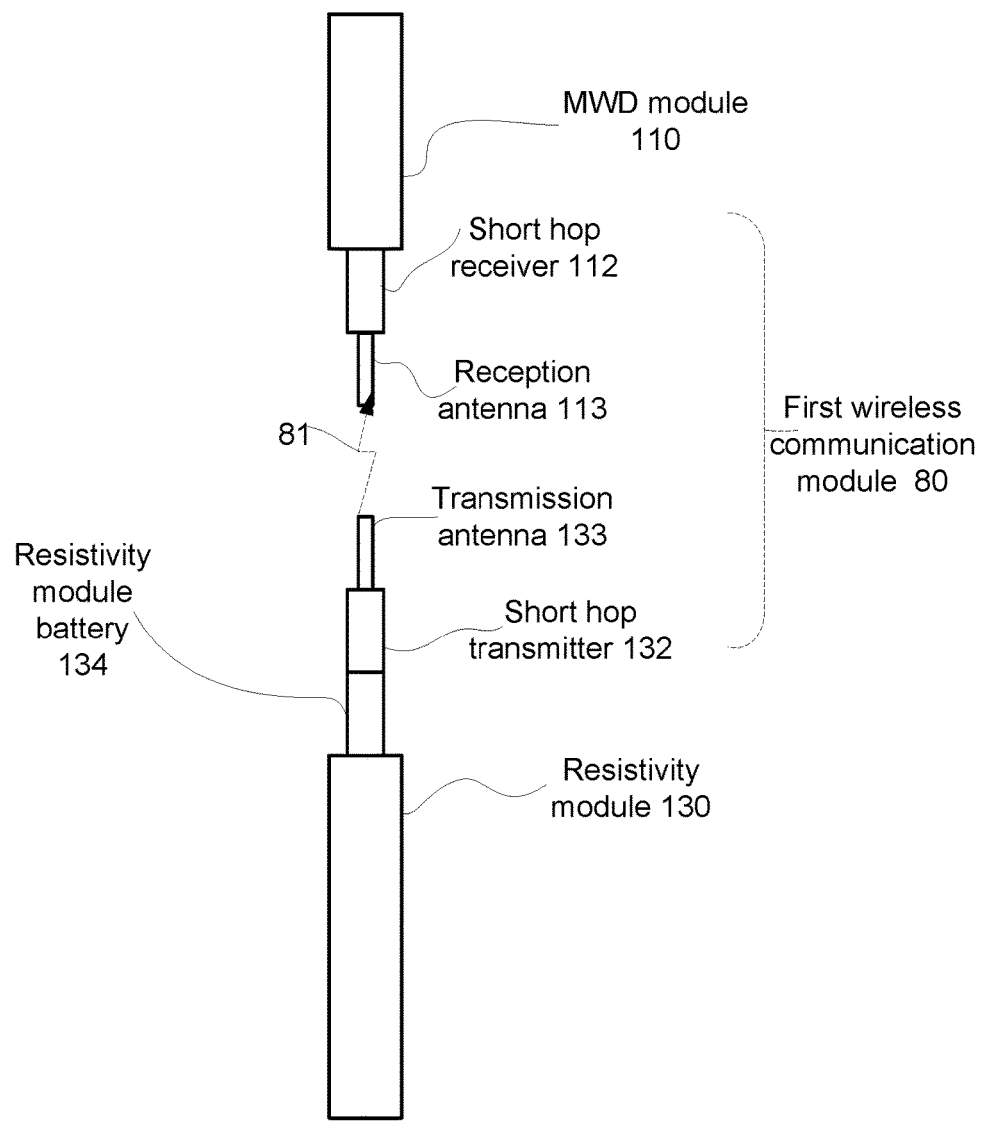
FIG. 2 illustrates some parts of the drilling string according to an embodiment of the invention.

FIG. 2 illustrates the MWD module 110, the resistivity module 130 and the first wireless communication module 80.

The first wireless communication module 80 is positioned between the MWD module 110 and the resistivity module 130.

The first wireless communication module 80 includes a short hop receiver 112 that may be electrically coupled to the MWD module 110 and a short hop transmitter 132 that may be electrically coupled to the resistivity module 130.

Due to the presence of the drilling fluid in the proximity to the devices, only a low frequency transmission is possible with a practical transmission distance of (for example) about sixty feet. For example—a maximum practical frequency of transmission is about one kilo Hertz (for example between 800 Hertz and 1200 Hertz), which may correspond to about 30 baud of data transmission rate.

The distance between the resistivity module and the MWD module may or may not exceed 60 feets. The distance may be changed when using short hop transmitter and short hop receivers that may properly operate over different distances.

FIG. 2 illustrates that a resistivity module battery 134 may positioned between the resistivity module 130 and the MWD module 110. The short hop transmitter may include a transmission antenna 133 that may be mounted on top (or otherwise located proximate to) of the resistivity module battery 134.

The transmission antenna 133 may be a coil of a magnetic wire that may be wound on a core. Any other type of transmission antenna may be used. The exact dimensions of the transmission antenna 133 and of the reception antenna 113 may be a function of the transmission frequency and the required distance between the MWD module 110 and the resistivity module 130.

Figure 3:
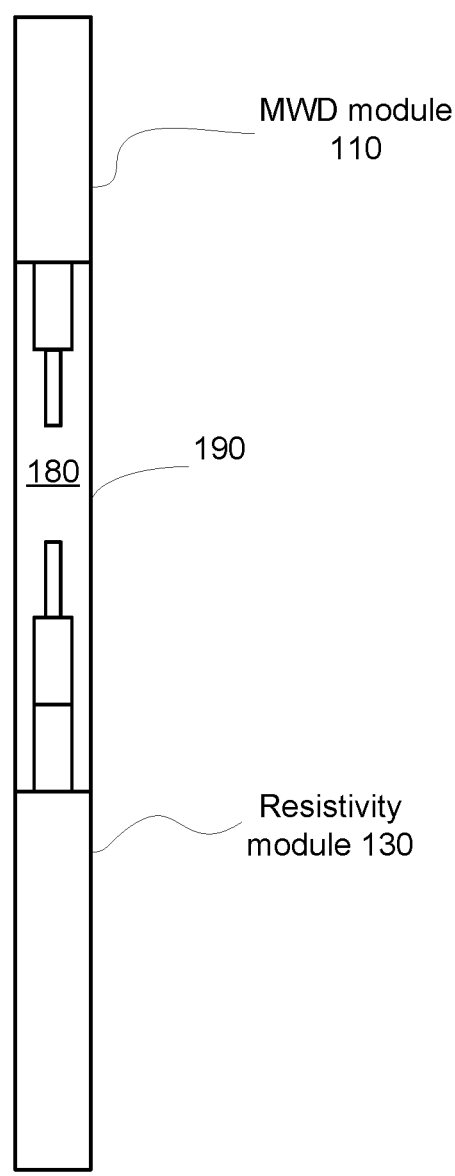
FIG. 3 illustrates some parts of the drilling string according to an embodiment of the invention.

FIG. 3 illustrates that the transmission between transmission antenna 133 and reception antenna 113 is performed within an inner space (for example a metal free space) formed within housing 190.

Figure 4:
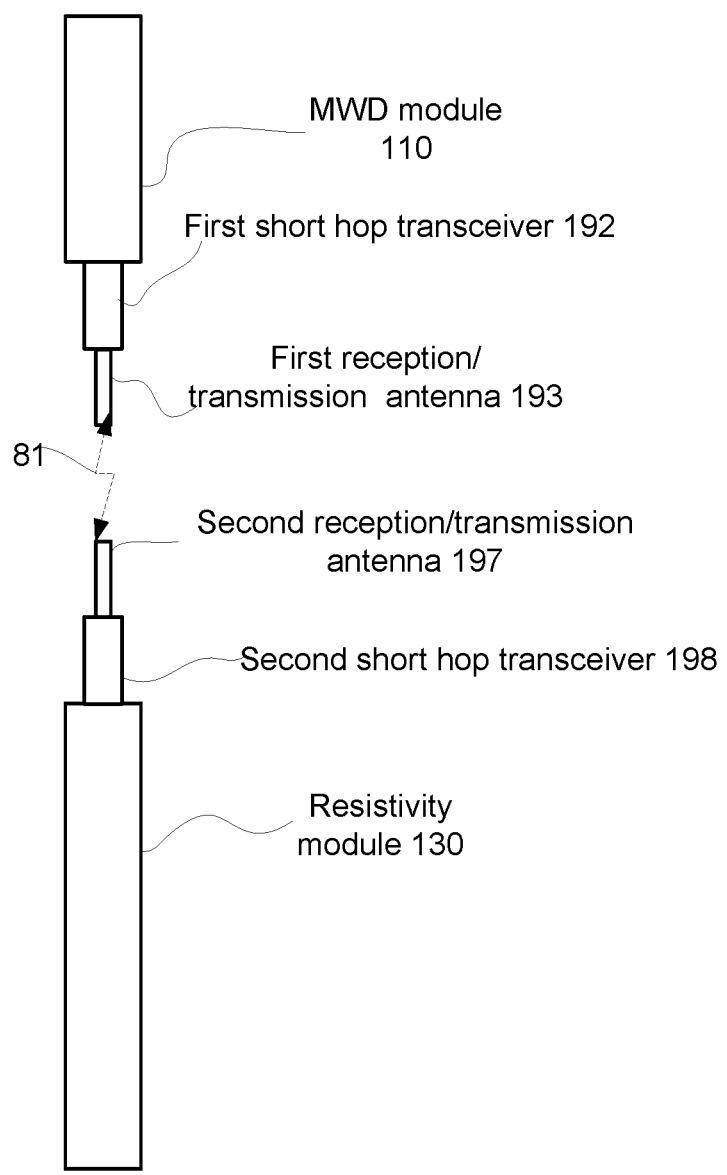
FIG. 4 illustrates some parts of the drilling string according to an embodiment of the invention.

FIG. 4 illustrates the first wireless communication module 80 as facilitating bidirectional wireless communication between MWD module 110 and resistivity module 130.

First wireless communication module 80 includes first short hop transceiver 192 (electrically coupled to MWD module 110), first reception/transmission antenna 193, second short hop transceiver 198 (electrically coupled to resistivity module 130) and second reception/transmission antenna 197.

Information, commands, or any type of signals may be provided from first short hop transceiver 192, transmitted by first reception/transmission antenna 193, received by second reception/transmission antenna 197 and fed to second short hop transceiver 198—or vice versa.

The bi-directional communication may include time division multiplexing or any other multiplexing (frequency, code).

The bi-directional information may be performed via formation 90.

Transmission of Information

FIG. 5 illustrates various examples of information that may be generated and sent to and from the MWD module 150.

Near bit sub 150 is illustrated as including sensors 151, resistivity module 130 is illustrated as including sensors 131 and MWD module 150 is illustrated as including sensors 111, one or more processors 112 and a controller 113. The number of sensors appearing in each module is only an example. The sensors of each module may be the same or may differ from each other or a combination thereof.

The resistivity module 130 may generate, in addition to the resistivity information, pressure information about a drilling fluid pressure.

The first wireless communication module (not shown) may send the pressure information and the resistivity information over first wireless link 81 to MWD module 110.

The first wireless communication module (not shown) may send the pressure information and the resistivity information over first wireless link 81 to MWD module 110.

The near bit sub 150 may generate inclination information and at least one out of gamma radiation information (about sensed gamma radiation) and rotation information about the rotation of the drill bit.

The second wireless communication module (not shown) may send the inclination information, the gamma radiation information, and the rotation information over second wireless link 82 to MWD module 110.

The MWD module 110 may generate azimuth information, tool face information, magnetics information about a magnetic field sensed by one or more sensors 111 and gravity information (gravity field sensed by one or more sensors 111).

The Tool Face (TF) is the rotational position of the drill string. There is an actual physical reference marker in the MWD string called the High Side (HS). When the HS faces upward, then TF=0 degrees. When the HS points straight down, then the TF=180 degrees, and so on.

The MWD module 110 may send the pressure information, the resistivity information, the inclination information, the gamma radiation information, the rotation information, the azimuth information, the tool face information, the magnetics information, and the gravity information to upper surface RX/TX module 105 that in turn may send said information to recipient.

It should be noted that any combinations or sub-combinations of the pressure information, the resistivity information, the inclination information, the gamma radiation information, the rotation information, the azimuth information, the tool face information, the magnetics information, and the gravity information may be received by or sensed by the MWD module and sent to upper surface RX/TX module 105.

For example, the sensors 111, 131 and 151 may include three magnetometers, three inclinometers (for example—X-axis, Y-axis and Z-axis inclinometers), a vibration sensor, a temperature sensor, a resistivity sensor, a gamma radiation sensor and a pressure sensor.

Readings from the three magnetometers and the three inclinometers may be processed (for example by the one or more processors 112 of the WMD module) to provide tool face, magnetic dip and rotation information.

Readings from the three magnetometers may be processed (for example by the one or more processors 112 of the WMD module) to provide information about the total magnetic field (TMF) and azimuth.

Readings from the three inclinometers may be processed (for example by the one or more processors 112 of the WMD module) to provide information about the total gravity field (TGF) and inclination.

Readings from the vibration sensor, the temperature sensor, the resistivity sensor, the gamma radiation sensor and the pressure sensor may be processed (for example by the one or more processors 112 of the WMD module) to provide vibration information, temperature information, resistivity information, gamma radiation information and pressure information, respectively.

The vibration sensor may also provide information about shocks.

The WDM module may include or may be coupled to three magnetometers, gamma radiation sensor, three inclinometers, vibration sensor and a temperature sensor. The near bit module may include or may be coupled to a gamma radiation sensor, three inclinometers and a vibration sensor. The resistivity module may include or may be coupled to a resistivity sensor and a pressure sensor. In this example both MWD module and the near bit module include three inclinometers and a gamma radiation sensor—to provide redundant information.

The one or more processor 112 of the MWD module 110 may process sensors readings and generate the required information. It is noted that the processing of sensor readings can be done in the near bit sub and/or in the resistivity module.

The temperature sensor, the three magnetometers, the gamma radiation sensor information may be located in the WDM module.

The WDM module may include controller 113 for controlling (for example multiplexing) the generation and/or transmission of the various types of information to the upper surface TX/RX 105 module.

According to an embodiment of the invention the MWD module may include different nits for processing different types of information and/or information from different sources (such as the resistivity module and the near bit sub).

For example—the MWD module may include the following units:

a. A directional unit that include or is coupled to or receives information from the three magnetometers, the three inclinometers (for example—accelerometers) and temperature sensor. This unit may be configured to calculate at least some of the following parameters: TMF, TGF, Dip, TF, Rotation, Inclination, Azimuth, Temperature.

b. A gamma unit that include or is coupled to or receives information from the gamma radiation sensor and the vibration sensor.

c. A power unit that controls and regulates the power from a battery unit of the WDM module.

The controller 113 may multiplex or otherwise arrange all the different types of information to one or more transmission packet, may encode the different types of information, and sends it to the upper surface TX/RX 105 module.

The exact types and/or format of information may be set by an operator or in another manner.

Each of said units may include one or more hardware processor and/or memory units.

Figure 6:
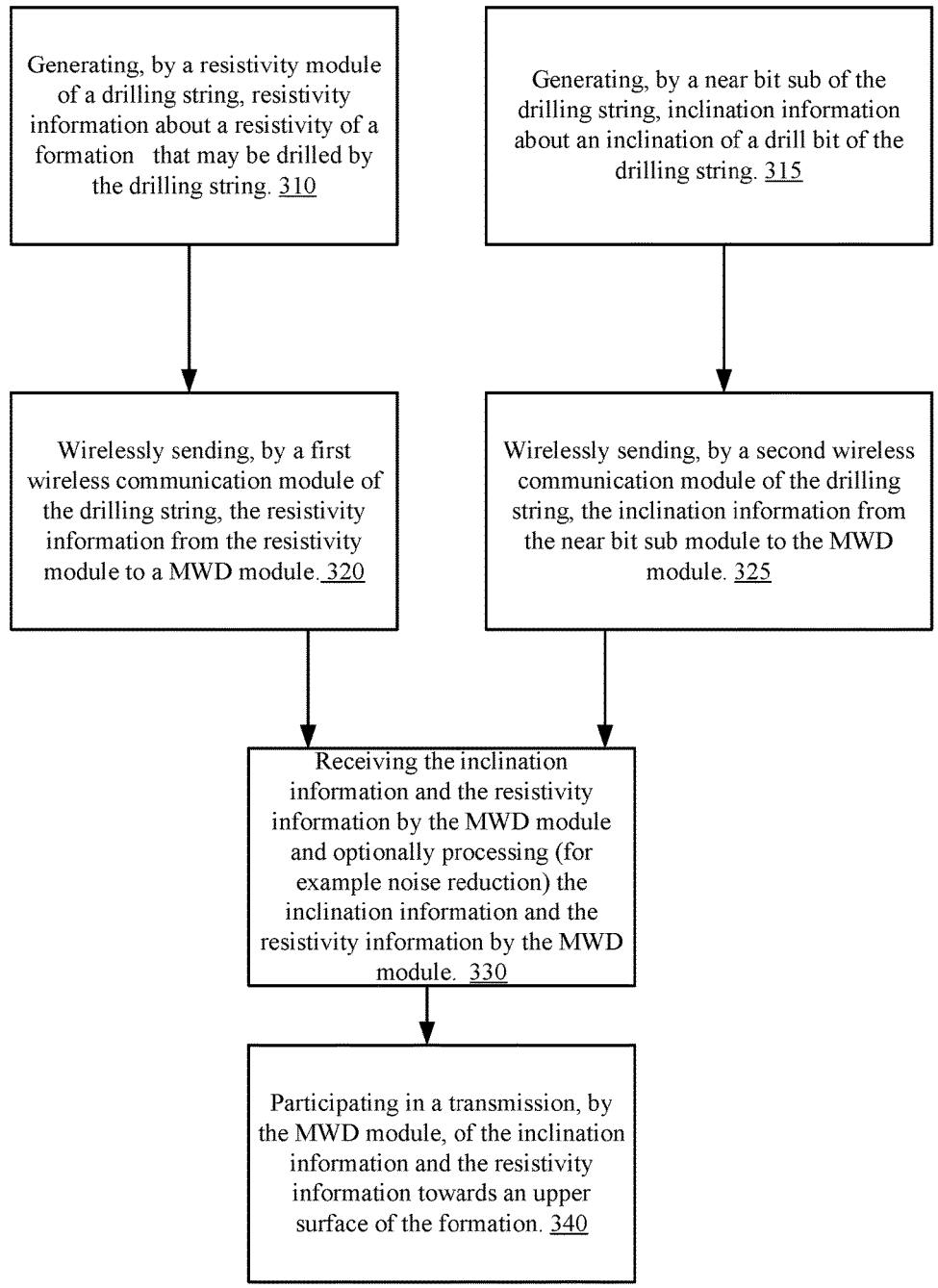
FIG. 6 illustrates a method according to an embodiment of the invention.

FIG. 6 illustrates method 300 per an embodiment of the invention.

Method 300 may start by steps 310 and 315.

Step 310 may include generating, by a resistivity module of a drilling string, resistivity information about a resistivity of a formation that may be drilled by the drilling string.

Step 315 may include generating, by a near bit sub of the drilling string, inclination information about an inclination of a drill bit of the drilling string.

Step 310 is followed by step 320 of wirelessly sending, by a first wireless communication module of the drilling string, the resistivity information from the resistivity module to a MWD module.

Step 315 is followed by step 325 of wirelessly sending, by a second wireless communication module of the drilling string, the inclination information from the near bit sub module to the MWD module.

Step 320 and 325 may be followed by step 330 of receiving the inclination information and the resistivity information by the MWD module and optionally processing (for example noise reduction) the inclination information and the resistivity information by the MWD module.

Step 330 may be followed by step 340 of participating in a transmission, by the MWD module, of the inclination information and the resistivity information towards an upper surface of the formation.

Step 340 may include transmitting the inclination information and the resistivity information by the MWD module, instructing and/or triggering another module (such as upper surface TX/RX 105 module of FIG. 1) to transmit the inclination information and the resistivity information or merely sending the inclination information and the resistivity information to the other module so that the other module transmits towards the upward surface of the formation the inclination information and the resistivity information.

It should be noted that:

a. Steps 310 and/or 320 may include generating additional and/or redundant information.

b. Steps 314 and/or 324 may include wirelessly transmitting the additional and/or redundant information to the MWD module.

c. Method 300 may also include generating by the WMD module additional and/or redundant information.

d. Step 340 may include participating in a transmission, by the MWD module, of the additional and/or redundant information towards an upper surface of the formation.

Examples of additional information may include pressure information, gamma radiation information, rotation information, azimuth information, tool face information, magnetics information and gravity information.

Method 300 may be executed by the drilling sequence of FIG. 1 and by any of the MWD systems of FIGS. 2-4.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A measurement while drilling (MWD) system for use in a drilling string, the MWD system comprises:
   a resistivity module that is configured to generate resistivity information about a resistivity of a formation that is drilled by the drilling string;
   a near bit sub that is configured to generate inclination information about an inclination of a drill bit of the drilling string;
   a MWD module;
   a first wireless communication module that is configured to wirelessly send the resistivity information from the resistivity module to the MWD module;
   a second wireless communication module that is configured to wirelessly send inclination information from the near bit sub module to the MWD module; and
   wherein the MWD module is configured to participate in a transmission of the inclination information and the resistivity information towards an upper surface of the formation.

2. The MWD system according to claim 1 wherein the first wireless communication module is configured to wirelessly send the resistivity information through an inner space of the drilling string.

3. The MWD system according to claim 2 wherein the second wireless communication module is configured to wirelessly send the resistivity information through the formation.

4. The MWD system according to claim 1 wherein the first wireless communication module comprises a short hop receiver that is electrically coupled to the MWD module and a short hop transmitter that is electrically coupled to the resistivity module.

5. The MWD system according to claim 4 wherein a distance between the resistivity module and the MWD module does not exceed 60 feets.

6. The MWD system according to claim 4 wherein the short hop receiver and the short hop transmitter communicate using low frequency radiation.

7. The MWD system according to claim 6 wherein the low frequency radiation is about 1 kilo Hertz.

8. The MWD system according to claim 4 comprising a resistivity module battery that is positioned between the resistivity module and the MWD module; wherein the short hop transmitter comprises a transmission antenna that is mounted on top of the resistivity module battery.

9. The MWD system according to claim 8 wherein the transmission antenna is a coil of a magnetic wire that is wound on a core.

10. The MWD system according to claim 1, wherein the resistivity module is further configured to generate pressure information about a drilling fluid pressure and wherein the first wireless communication module is configured to wirelessly send the pressure information from the resistivity module to the MWD module.

11. The MWD system according to claim 1, wherein the near bit sub is further configured to generate gamma radiation information about gamma radiation, rotation information about a rotation of the drill bit and vibration information about vibrations of the drill bit; and wherein the second wireless communication module is configured to wirelessly send the gamma radiation information, rotation information and the vibration information to the MWD module.

12. The MWD system according to claim 11, wherein MWD module is configured to participate in a transmission of the inclination information, the resistivity information, the gamma radiation information, the rotation information, and the vibration information towards the upper surface of the formation.

13. The MWD system according to claim 12, wherein MWD module is configured to generate azimuth information about an azimuth of the drilling string, magnetic information, and gravity information; and to participate in a transmission of the inclination information, the resistivity information, the gamma radiation information, the rotation information, the vibration information, the azimuth information, the magnetic information, and the gravity information towards the upper surface of the formation.

14. The MWD system according to claim 1, wherein MWD module is configured to generate azimuth information about an azimuth of the drilling string, magnetic information, and gravity information; and to participate in a transmission of the inclination information, the resistivity information, the azimuth information, the magnetic information, and the gravity information towards the upper surface of the formation.

15. A method, comprising:
   generating, by a resistivity module of a drilling string, resistivity information about a resistivity of a formation that is drilled by the drilling string;

generating, by a near bit sub of the drilling string, inclination information about an inclination of a drill bit of the drilling string;

wirelessly sending, by a first wireless communication module of the drilling string, the resistivity information from the resistivity module to a measurement while drilling (MWD) module;

wirelessly sending, by a second wireless communication module of the drilling string, the inclination information from the near bit sub module to the MWD module; and participating in a transmission, by the MWD module, of the inclination information and the resistivity information towards an upper surface of the formation.

16. The method according to claim 15 comprising wirelessly sending the resistivity information to the MWD module through an inner space of the drilling string.

17. The method according to claim 16 comprising wirelessly sending the resistivity information to the MWD module through the formation.

18. The method according to claim 15 wherein the first wireless communication module comprises a short hop receiver that is electrically coupled to the MWD module and a short hop transmitter that is electrically coupled to the resistivity module.

19. The method according to claim 18 wherein a distance between the resistivity module and the MWD module does not exceed 60 feets.

20. The method according to claim 18 comprising transmitting the resistivity information to the short hop receiver and from the short hop transmitter using low frequency radiation.

* * * * *